United States Patent
Oue et al.

(10) Patent No.: US 8,548,704 B2
(45) Date of Patent: Oct. 1, 2013

(54) LOCK-UP CLUTCH CONTROL DEVICE FOR AUTOMATIC TRANSMISSION AND CONTROL METHOD THEREOF

(75) Inventors: Tomoko Oue, Yokohama (JP); Morimasa Yamawaki, Yokohama (JP); Kouichi Sawano, Shizuoka (JP)

(73) Assignee: Jatco Ltd, Fuji-shi (JP)

( * ) Notice: Subject to any disclaimer, the term of this patent is extended or adjusted under 35 U.S.C. 154(b) by 986 days.

(21) Appl. No.: 12/330,021

(22) Filed: Dec. 8, 2008

(65) Prior Publication Data

US 2009/0164078 A1 Jun. 25, 2009

(30) Foreign Application Priority Data

Dec. 21, 2007 (JP) ................. 2007-329744

(51) Int. Cl.
*G07F 7/00* (2006.01)
*G07F 17/00* (2006.01)
*G07F 19/00* (2006.01)

(52) U.S. Cl.
USPC ............ 701/67; 701/68; 192/3.28; 192/3.31; 477/62; 477/64; 477/70; 477/86; 477/176

(58) Field of Classification Search
USPC ................ 701/67, 68; 192/3.28, 3.29, 3.3, 192/3.31; 477/62–64, 70, 71, 74, 77–80, 477/83–89, 168, 169, 175, 176
See application file for complete search history.

(56) References Cited

U.S. PATENT DOCUMENTS

| 5,616,100 | A | 4/1997 | Sakai et al. |
| 6,139,472 | A | 10/2000 | Harada et al. |
| 2004/0111203 | A1* | 6/2004 | Higashimata et al. .......... 701/51 |

FOREIGN PATENT DOCUMENTS

| JP | 6-174075 A | 6/1994 |
| JP | 09-060722 A | 3/1997 |

* cited by examiner

*Primary Examiner* — Jeffrey Shapiro
(74) *Attorney, Agent, or Firm* — Foley & Lardner LLP

(57) ABSTRACT

This invention is a lock-up clutch control device for an automatic transmission, comprising lock-up clutch control means for controlling a slip amount of the lock-up clutch to a target slip amount. When a variation rate in a required load of an engine reaches or exceeds a predetermined threshold, the target slip amount is increased at a predetermined increase rate, whereupon the target slip amount, having been increased by target slip amount increasing means, is reduced at a predetermined reduction rate. At this time, the predetermined reduction rate is set to decrease as an operating condition when the variation rate of the required load reaches or exceeds the predetermined threshold approaches an operating condition in which an increase rate of a rotation speed on the automatic transmission side of a torque converter relative to an increase in the required load is low.

10 Claims, 7 Drawing Sheets

LOCK-UP CLUTCH CONTROL DEVICE FOR AUTOMATIC TRANSMISSION AND CONTROL METHOD THEREOF

FIELD OF THE INVENTION

This invention relates to control of a lock-up clutch.

BACKGROUND OF THE INVENTION

A lock-up clutch is a clutch that directly couples an input side and an output side of a torque converter. When a vehicle operating condition, defined on the basis of a vehicle speed and a throttle opening, is in a predetermined region, a slip amount of the lock-up clutch is slip-controlled to a target slip amount.

If an engine torque varies rapidly during the slip control, tip-in shock occurs. JP06-174075A discloses a technique according to which a target slip amount is increased when a variation rate of the throttle opening equals or exceeds a predetermined value during the slip control, and when the variation rate of the throttle opening falls to or below a predetermined value thereafter, the target slip amount is reduced gradually over a time period corresponding to the increase in the variation rate of the throttle opening.

SUMMARY OF THE INVENTION

However, in the conventional technique described above, the reduction rate of the target slip amount is determined only by the time period corresponding to the increase in the variation rate of the throttle opening, without taking into account the increase rate of a turbine rotation speed. Therefore, shock may occur when the slip amount decreases to a steady state value. The increase rate of the turbine rotation speed differs according to the vehicle speed and speed ratio, and therefore, when the reduction rate of the target slip amount is determined without taking the turbine rotation speed into account, it is impossible to return to the steady state value appropriately, and as a result, shock occurs.

It is an object of this invention to suppress shock occurring when a target slip amount of a lock-up clutch is reduced after being increased during rapid variation in an engine load.

In order to achieve the above object, this invention provides a lock-up clutch control device for an automatic transmission that comprises a lock-up clutch which is provided in a torque converter interposed between an engine of a vehicle and an automatic transmission and which is capable of engaging an engine side and an automatic transmission side of the torque converter, a lock-up clutch control unit which controls a slip amount of the lock-up clutch, which is a rotation speed difference between the engine side and the automatic transmission side, to a target slip amount, a required load variation rate calculation unit which calculates a variation rate in a required load of the engine, a target slip amount increasing unit which increases the target slip amount at a predetermined increase rate when the variation rate of the required load is equal to or greater than a predetermined threshold, and a target slip amount reducing unit which reduces the target slip amount increased by the target slip amount increasing unit at a predetermined reduction rate, and that the predetermined reduction rate is set to decrease as an operating condition when the variation rate of the required load reaches or exceeds the predetermined threshold approaches an operating condition in which an increase rate of the rotation speed on the automatic transmission side of the torque converter relative to an increase in the required load is low.

The details as well as other features and advantages of this invention are set forth in the remainder of the specification and are shown in the accompanying drawings.

DESCRIPTION OF THE PREFERRED EMBODIMENTS

Figure 1:
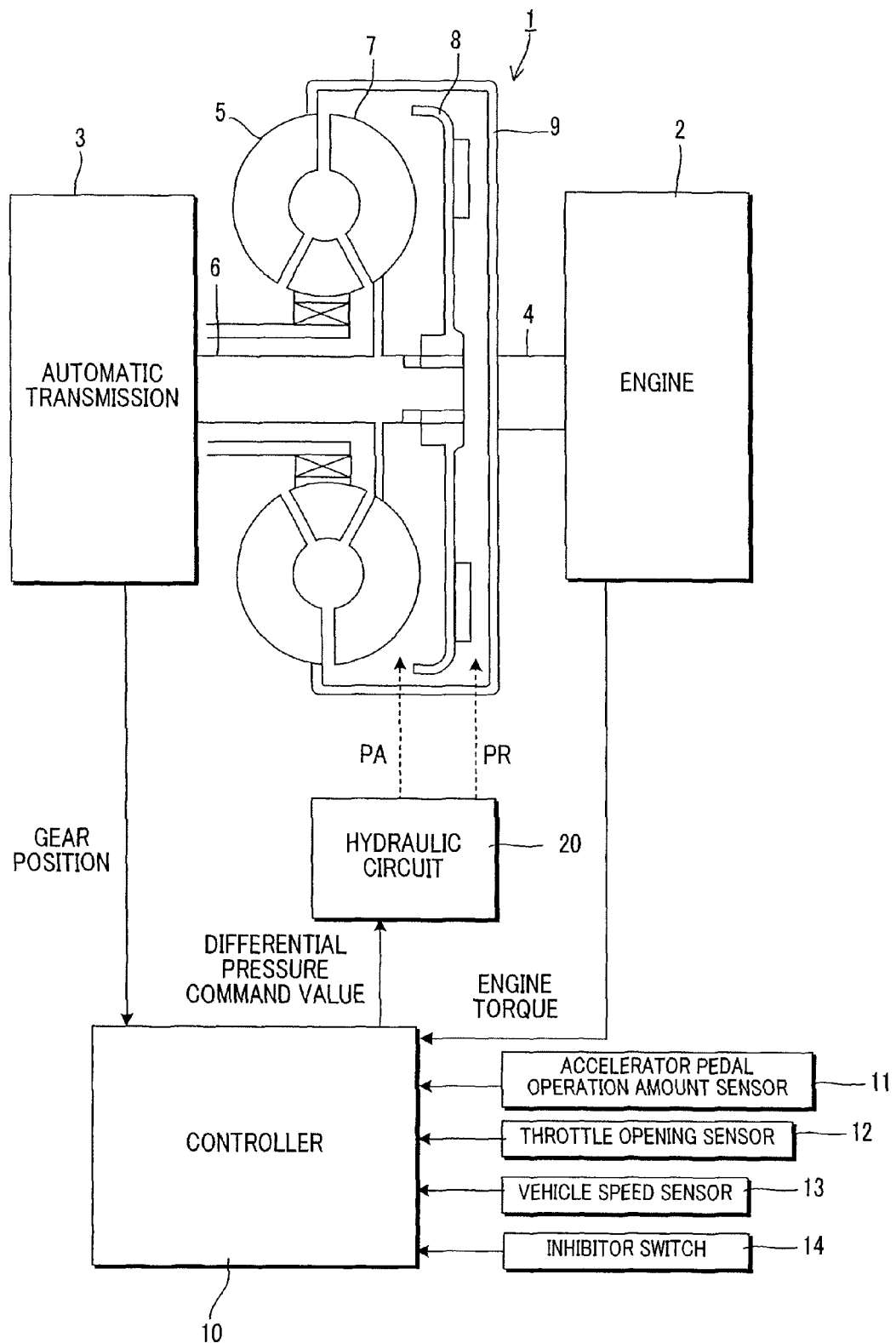
FIG. 1 is a schematic diagram showing the constitution of a lock-up clutch control device for an automatic transmission, according to an embodiment.

An embodiment of this invention will be described in detail below with reference to the figures and so on. FIG. 1 is a schematic diagram showing a lock-up clutch control device for an automatic transmission according to this embodiment. A torque converter 1 is interposed between an engine 2 and an automatic transmission 3, and transmits a driving force of the engine 2 to the automatic transmission 3 via a fluid. A pump impeller 5 connected to an output shaft 4 of the engine 2 and a turbine runner 7 connected to an input shaft 6 of the automatic transmission 3 are disposed in the torque converter 1 so as to face each other. When the pump impeller 5 rotates in accordance with rotation of the engine 2, a fluid (ATF) charged into the interior of the torque converter 1 flows, and as a result, the turbine runner 7 rotates.

Further, a lock-up clutch 8 that is connected to the input shaft 6 of the automatic transmission 3 and rotates together with the turbine runner 7 is provided on the inside of a front cover 9 that is connected to the output shaft 4 of the engine 2 and formed integrally with the pump impeller 5. When the lock-up clutch 8 is engaged to the pump impeller 5, an input element and an output element of the torque converter 1 are directly coupled, thereby a relative rotation between the input element and the output element is eliminated and the torque converter 1 becomes a complete lock-up state. Further, when the input element and output element are set in a semi-engaged state, the torque converter 1 becomes a slip lock-up state, in which slippage occurs between the input element and the output element. When the lock-up clutch 8 is completely released, the torque converter 1 becomes a non-lock-up state.

The lock-up clutch 8 is operated in accordance with a differential pressure between a torque converter apply pressure PA and a torque converter release pressure PR acting on either side thereof. When the release pressure PR is higher than the apply pressure PA, the lock-up clutch 8 is released, and when the release pressure PR is lower than the apply pressure PA, the lock-up clutch 8 is engaged.

The torque of the torque converter 1 that can be transmitted by the lock-up clutch 8, or in other words a lock-up capacity, is dependent on an engaging force of the lock-up clutch 8, and is determined by the aforementioned differential pressure. The differential pressure is controlled on the basis of a target slip amount calculated by a controller. The target slip amount is a rotation speed difference between the input element and output element of the torque converter 1, and as the target slip amount increases, the differential pressure decreases, leading to a reduction in the engaging force of the lock-up clutch 8.

A controller 10 receives an accelerator pedal operation amount, a throttle opening, a vehicle speed, and a select position signal from an accelerator pedal operation amount sensor 11, a throttle opening sensor 12, a vehicle speed sensor 13, and an inhibitor switch 14, respectively, and calculates the target slip amount of the lock-up clutch 8 on the basis of this information together with an engine torque and a gear position. Further, the controller 10 calculates a differential pressure command value on the basis of the calculated target slip amount, and transmits this differential pressure command value to a hydraulic circuit 20, whereby an oil pressure supplied to the lock-up clutch 8 is controlled. It should be noted that lock-up clutch control is only performed in a D range and an M range.

The non-lock-up state, slip lock-up state, and complete lock-up state, which serve as the engagement states of the lock-up clutch 8, are determined on the basis of an operating condition defined by the vehicle speed and the throttle opening. If the throttle opening varies rapidly in the slip lock-up state or the complete lock-up state, the engine torque, i.e. torque input into the automatic transmission 3, varies rapidly, and tip-in shock may occur as a result. To prevent this, control is performed to increase the target slip amount in accordance with the increase in the throttle opening, and then reduce the target slip amount. This target slip amount control will now be described with reference to FIG. 2.

Figure 2:
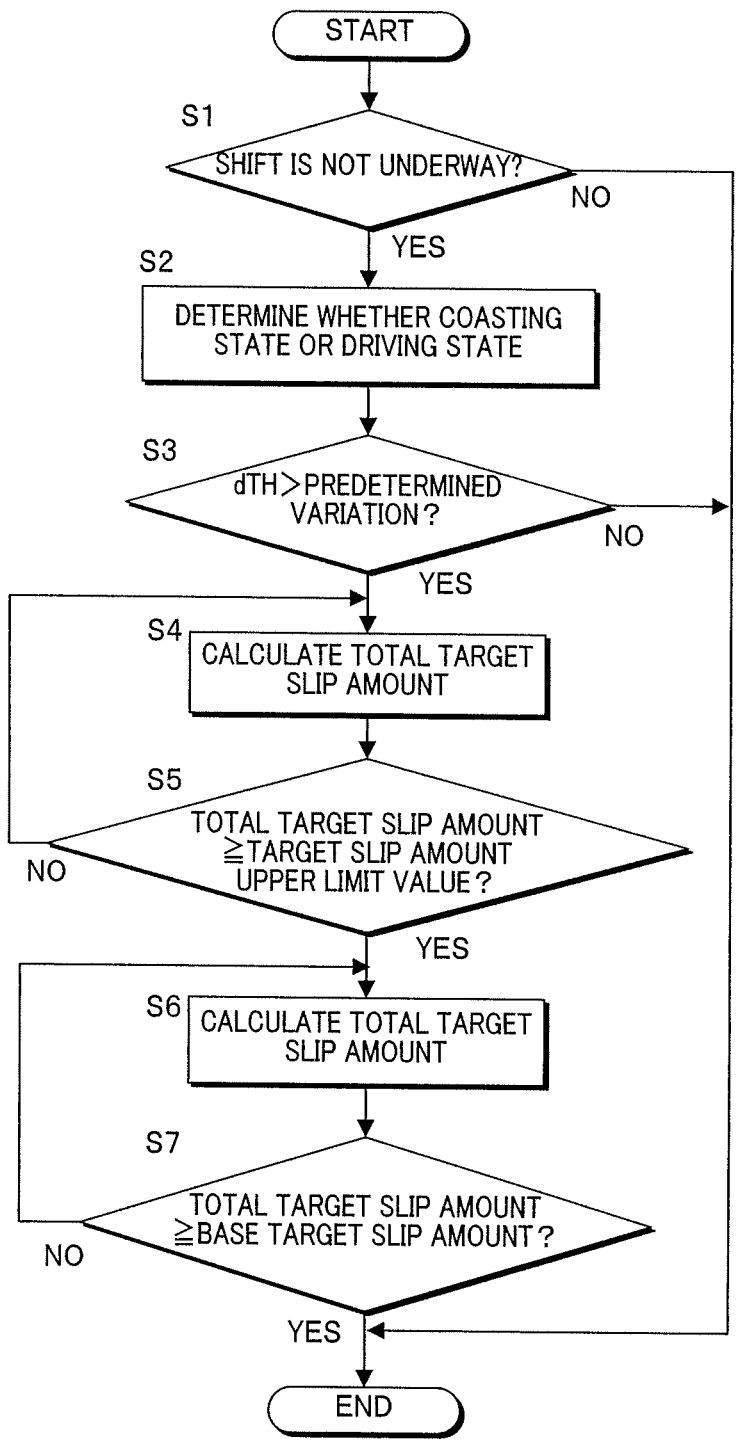
FIG. 2 is a flowchart showing lock-up clutch control of the automatic transmission, according to this embodiment.

FIG. 2 is a flowchart showing lock-up clutch control of the automatic transmission according to this embodiment. FIG. 2 shows only control for calculating a total target slip amount, but in reality, the differential pressure command value is calculated on the basis of the calculated total target slip amount, and the oil pressure supply to the lock-up clutch 8 is controlled in accordance with the differential pressure command value.

In a step S1, a determination is made as to whether or not a shift is underway. When a shift is not underway, the routine advances to a step S2, and when a shift is underway, the processing is terminated.

In the step S2, a determination is made as to whether a coasting state or a driving state is established.

In a step S3, a determination is made as to whether or not a variation dTH in the throttle opening per unit time is greater than a predetermined variation. When the throttle opening variation dTH is greater than the predetermined variation, the routine advances to a step S4, and when the throttle opening variation dTH is equal to or smaller than the predetermined variation, the processing is terminated.

Figure 3A:
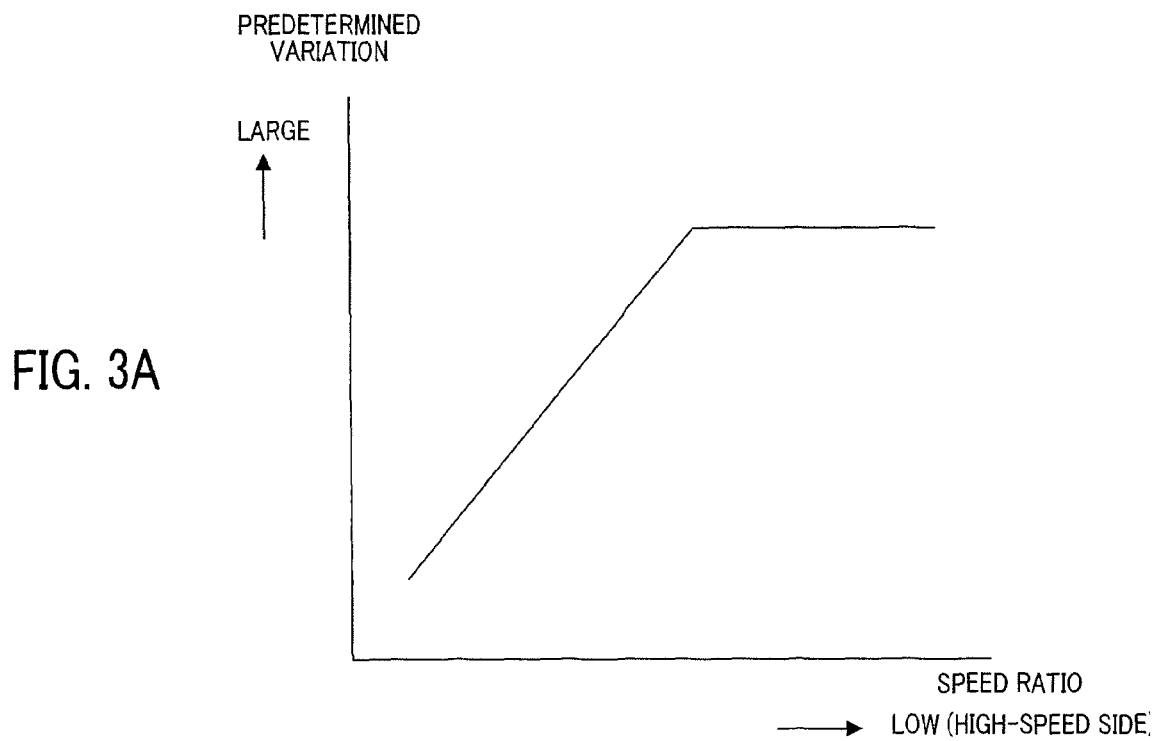
FIG. 3A is a map showing a relationship between a speed ratio and a predetermined variation.
Figure 3B:
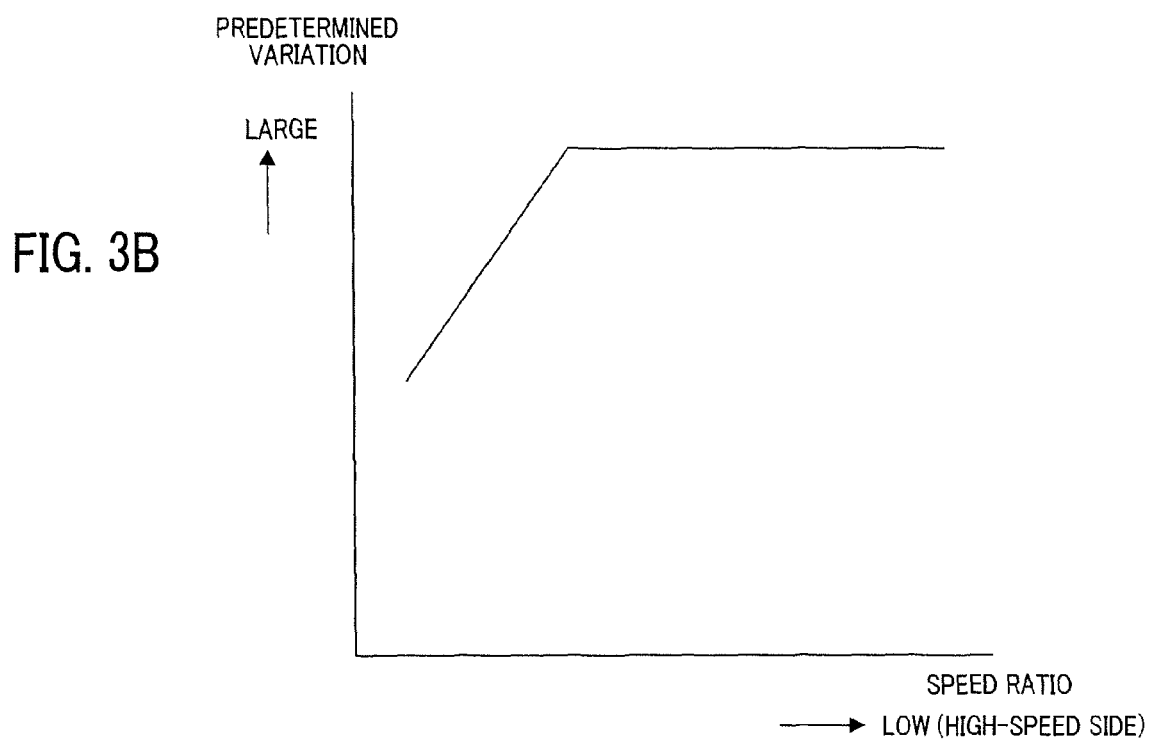
FIG. 3B is a map showing a relationship between a speed ratio and a predetermined variation.

The predetermined variation is a threshold for determining whether or not to execute the control of steps S4 to S7, to be described below, and is calculated by referring to a map shown in FIG. 3. FIG. 3A shows a map referred to when the coasting state is determined in the step S2, and FIG. 3B shows a map referred to when the driving state is determined in the step S2. The threshold is set to be larger when the driving state is established. Further, in both FIG. 3A and FIG. 3B, the predetermined variation is set to increase as the speed ratio decreases, or in other words as the gear position is a high speed gear position, and at a predetermined high speed gear position, the predetermined variation is set at a large value such that the control to be described below is less likely to be performed than at a low speed gear position.

In the step S4, a total target slip amount Tslip_total is calculated. The total target slip amount Tslip_total is calculated on the basis of the following equations (1) and (2).

$$T\text{slip}=T\text{slip}(-1)+dltT\text{slip} \tag{1}$$

$$T\text{slip\_total}=T\text{slip\_base}+T\text{slip} \tag{2}$$

Here, Tslip is the target slip amount, Tslip (−1) is an immediately preceding target slip amount, dltTslip is a target slip amount increase, and Tslip_base is a base target slip amount.

Figure 4:
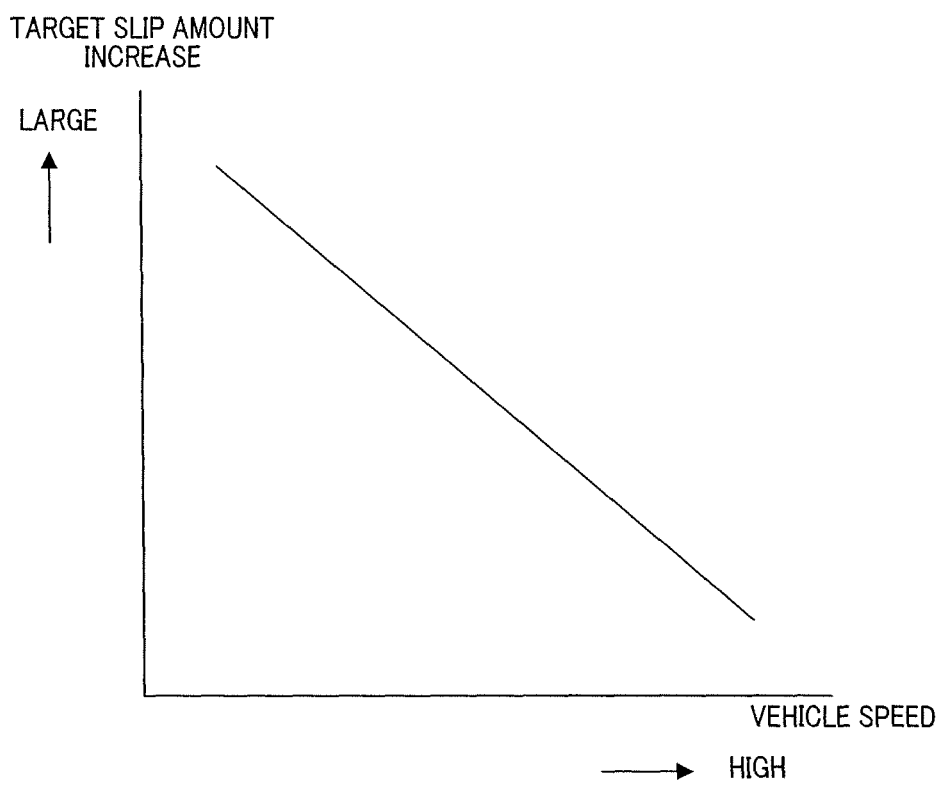
FIG. 4 is a map showing a relationship between a vehicle speed and a target slip amount increase.

The target slip amount increase dltTslip is the increase rate (incline) of the target slip amount, and is calculated by referring to a map shown in FIG. 4. More specifically, the target slip amount increase dltTslip is set to increase as a vehicle speed at which the throttle opening variation dTH exceeds the predetermined variation decreases.

The base target slip amount Tslip_base is a slip amount set at all times from a stationary state as a measure for preventing muffled noise, and is set such that the slip amount increases as the engine torque decreases, for example. Further, the base target slip amount Tslip_base is set at zero in the complete lock-up state.

In a step S5, a determination is made as to whether or not the total target slip amount Tslip_total is equal to or greater than a target slip amount upper limit value Tslip_max. When the total target slip amount Tslip_total is equal to or greater than the target slip amount upper limit value Tslip_max, the routine advances to a step S6, and when total target slip amount Tslip_total is smaller than the target slip amount upper limit value Tslip_max, the routine returns to the step S4.

Figure 5A:
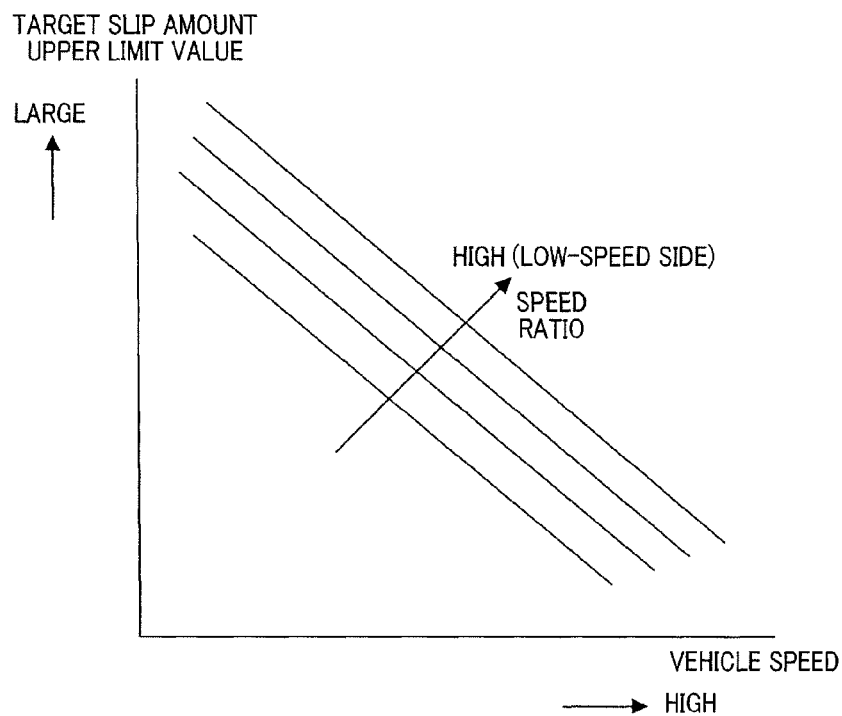
FIG. 5A is a map showing a relationship between the vehicle speed and a target slip amount upper limit value.
Figure 5B:
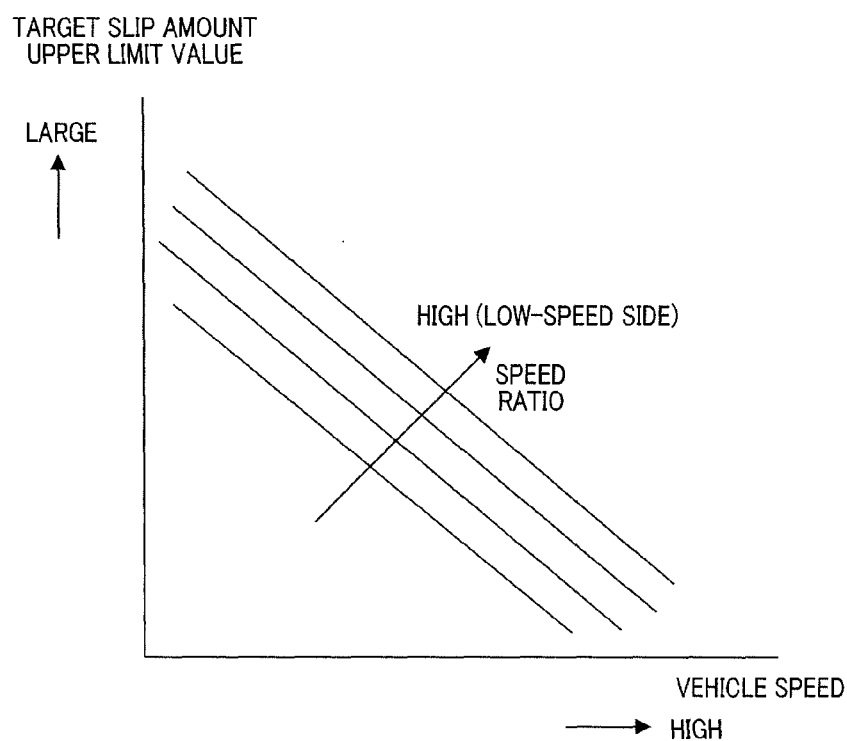
FIG. 5B is a map showing a relationship between the vehicle speed and a target slip amount upper limit value.

The target slip amount upper limit value Tslip_max is calculated by referring to a map shown in FIG. 5. FIG. 5A shows a map referred to when the coasting state is determined in the step S2, and FIG. 5B shows a map referred to when the driving state is determined in the step S2. The target slip amount upper limit value Tslip_max is set to be larger when the coasting state is established. Further, in both FIG. 5A and FIG. 5B, the target slip amount upper limit value Tslip_max is set to increase as the speed ratio at which the throttle opening variation dTH exceeds the predetermined variation increases, or in other words as the gear position is a low speed gear position, and as the vehicle speed decreases.

In a step S6, the total target slip amount Tslip_total is calculated. The total target slip amount Tslip_total is calculated on the basis of the following equations (3) and (4).

$$T\text{slip}=T\text{slip}(-1)+dltT\text{slip}D \tag{3}$$

$$T\text{slip\_total}=T\text{slip\_base}+T\text{slip} \tag{4}$$

Here, dltTslipD is a target slip amount reduction, and corresponds to dltTslipD≤0.

Figure 6A:
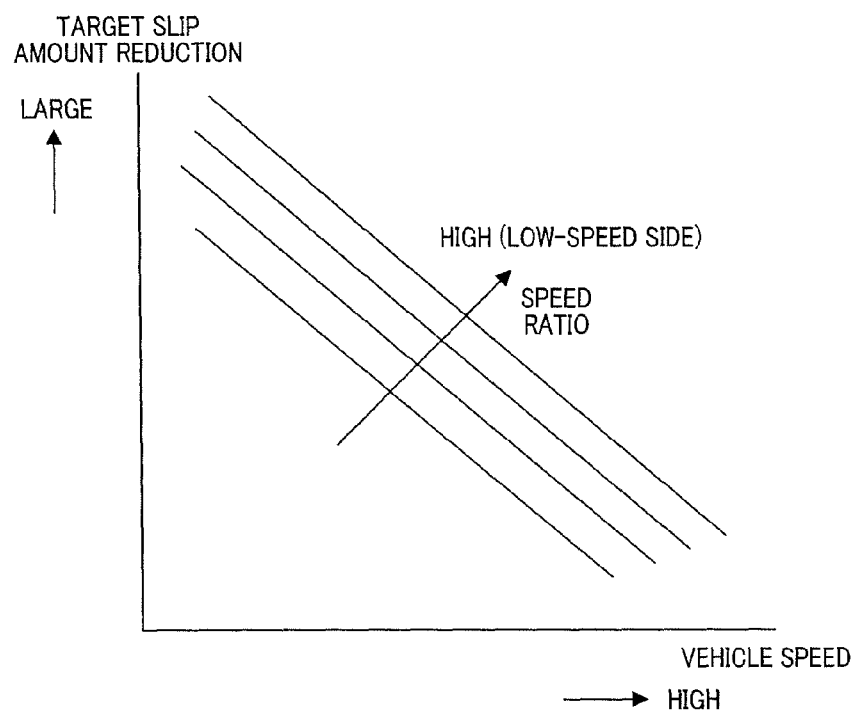
FIG. 6A is a map showing a relationship between the vehicle speed, the speed ratio, and a target slip amount reduction.
Figure 6B:
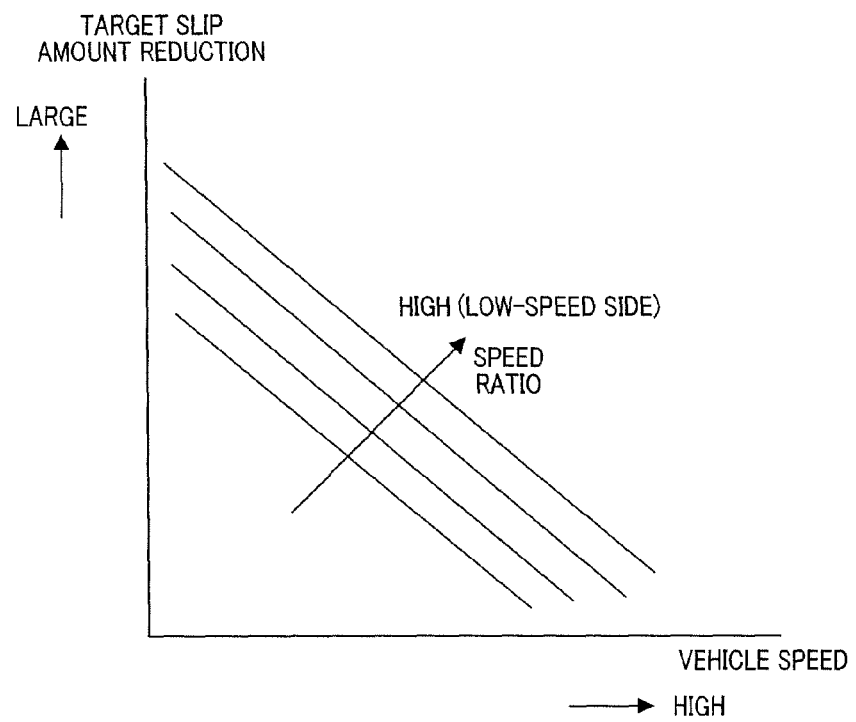
FIG. 6B is a map showing a relationship between the vehicle speed, the speed ratio, and a target slip amount reduction.

The target slip amount reduction dltTslipD is calculated by referring to a map shown in FIG. 6. FIG. 6A shows a map referred to when the coasting state is determined in the step S2, and FIG. 6B shows a map referred to when the driving state is determined in the step S2. The target slip amount reduction dltTslipD is set to be larger in the coasting state. Further, in both FIG. 6A and FIG. 6B, the target slip amount reduction dltTslipD is set to increase as the speed ratio at which the throttle opening variation dTH exceeds the predetermined variation increases, or in other words as the gear position is a low speed gear position, and as the vehicle speed decreases.

In a step S7, a determination is made as to whether or not the total target slip amount Tslip_total is equal to or greater than the base target slip amount. When the total target slip amount Tslip_total is equal to or greater than the base target slip amount, the processing is terminated, and when total target slip amount Tslip_total is smaller than the base target slip amount, the routine returns to the step S6.

In the control described above, when the throttle opening variation dTH per unit time exceeds the predetermined variation, the total target slip amount Tslip_total is increased to the target slip amount upper limit value Tslip_max, and once the total target slip amount Tslip_total has reached the target slip amount upper limit value Tslip_max, the total target slip amount Tslip_total is reduced to the base target slip amount Tslip_base.

Figure 7:
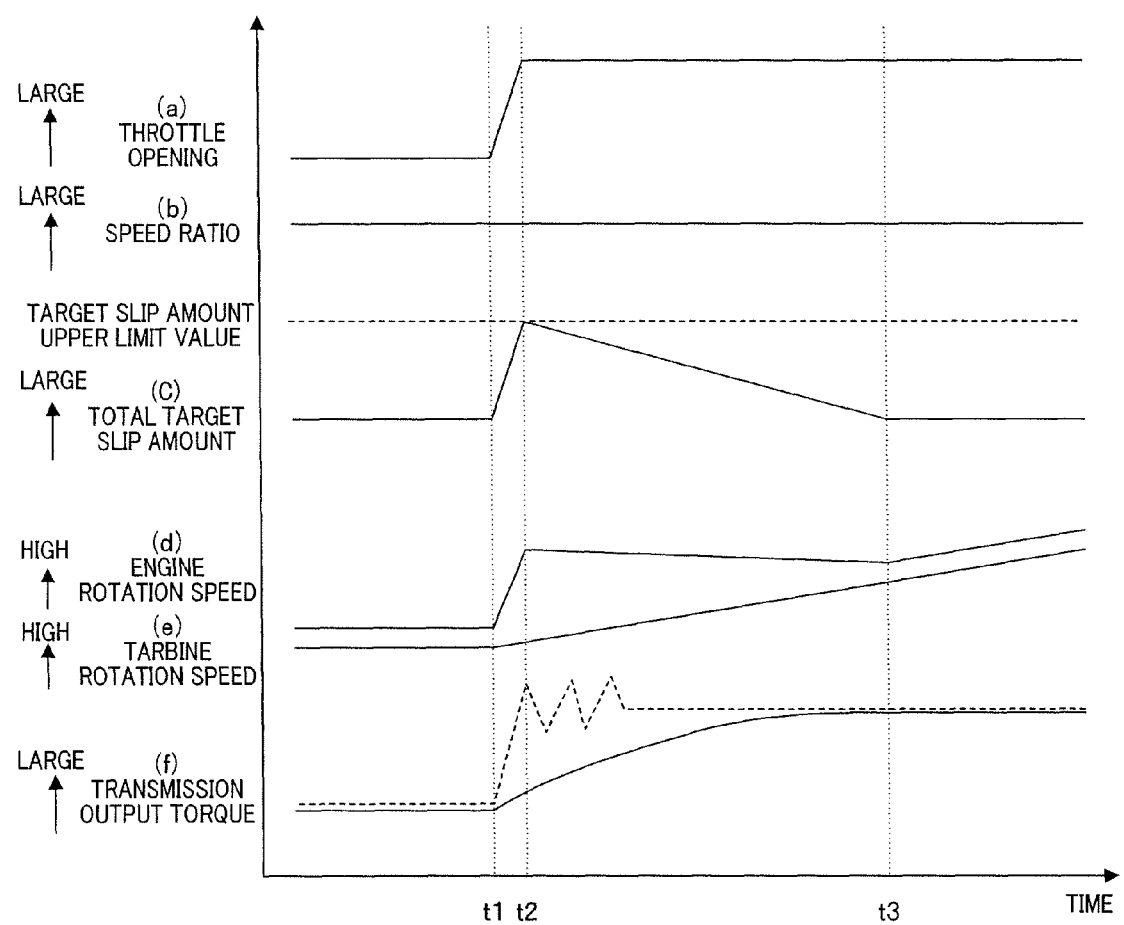
FIG. 7 is a time chart showing actions of the lock-up clutch control of an automatic transmission according to this embodiment.

Next, actions of this embodiment will be described with reference to FIG. 7. FIG. 7 is a time chart showing the lock-up clutch control for an automatic transmission according to this embodiment. In FIG. 7, (a), (b), (c), (d), (e), and (f) denote the throttle opening, the speed ratio, the total target slip amount Tslip_total, the engine rotation speed, the turbine rotation speed, and the transmission output torque, respectively. It should be noted that in (f) a dotted line shows transmission output torque variation in a conventional example.

At a time t1, the throttle opening variation dTH exceeds the predetermined variation, and since a shift is not underway (the speed ratio is fixed), the total target slip amount Tslip_total is increased gradually in accordance with the target slip amount increase dltTslip. Accordingly, the slip amount of the lock-up clutch 8 increases, and as a result, the engine rotation speed increases such that a rotation speed difference is generated between the engine rotation speed and the turbine rotation speed.

When the total target slip amount Tslip_total reaches the target slip amount upper limit value at a time t2, the total target slip amount Tslip_total is reduced gradually in accordance with the target slip amount reduction dltTslipD. Accordingly, the slip amount of the lock-up clutch 8 decreases, and as a result, the rotation speed difference between the engine rotation speed and the turbine rotation speed decreases gently. At a subsequent time t3, the total target slip amount Tslip_total falls to the base target slip amount Tslip_base. As a result, the output torque of the automatic transmission increases gently, and thus tip-in shock is prevented.

In this embodiment, as described above, the target slip amount reduction dltTslipD is set to decrease as the operating condition when the throttle opening variation dTH exceeds the predetermined variation approaches an operating condition in which the increase rate of the turbine rotation speed relative to an increase in the engine load is low. Therefore, the target slip amount can be reduced in accordance with the operating condition, and the occurrence of discomfort and shock can be suppressed.

Further, the target slip amount reduction dltTslipD is set to decrease as the vehicle speed at which the throttle opening variation dTH exceeds the predetermined variation increases. Therefore, the target slip amount can be reduced in accordance with the vehicle speed, whereby discomfort and shock can be suppressed, even when the vehicle speed is high and the increase rate of the turbine rotation speed relative to an increase in the engine load is low.

Moreover, the target slip amount reduction dltTslipD is set to decrease as the speed ratio at which the throttle opening variation dTH exceeds the predetermined variation decreases. Therefore, the target slip amount can be reduced in accordance with the speed ratio, whereby discomfort and shock can be suppressed, even when the speed ratio is small and the increase rate of the turbine rotation speed relative to an increase in the engine load is low.

Furthermore, the predetermined variation is set to be smaller when the vehicle is determined to be in the coasting state than when the vehicle is determined to be in the driving state, and therefore, in the coasting state, the control is executed even if the throttle opening variation dTH is small. As a result, tip-in shock occurring when the engine torque varies rapidly from negative to positive can be suppressed.

Furthermore, the predetermined variation is set to increase as the speed ratio decreases, and therefore the control is more likely to be executed when the speed ratio is large such that tip-in shock is more likely to occur. Thus, the occurrence of tip-in shock can be suppressed.

Furthermore, the target slip amount increase dltTslip is set to increase as the vehicle speed at which the throttle opening variation dTH exceeds the predetermined variation decreases, and therefore the slip amount is increased more quickly when the vehicle speed is low such that tip-in shock due to rapid variation in the engine torque is more likely to occur. As a result, the occurrence of tip-in shock can be suppressed.

Furthermore, the target slip amount upper limit value Tslip_max is set to increase as the vehicle speed at which the throttle opening variation dTH exceeds the predetermined variation decreases, and therefore the slip amount is increased by a larger extent when the vehicle speed is low such that tip-in shock due to rapid variation in the engine torque is more likely to occur. As a result, the occurrence of tip-in shock can be suppressed.

Furthermore, the target slip amount upper limit value Tslip_max is set to increase as the speed ratio at which the throttle opening variation dTH exceeds the predetermined variation increases, and therefore the slip amount is increased by a larger extent when the speed ratio is large such that tip-in shock due to rapid variation in the engine torque is more likely to occur. As a result, the occurrence of tip-in shock can be suppressed.

Furthermore, the target slip amount upper limit value Tslip_max is set to be larger in the coasting state than in the driving state, and therefore the slip amount is increased by a larger extent in a condition where tip-in shock due to rapid variation in the engine torque is more likely to occur, as in the coasting state. As a result, the occurrence of tip-in shock can be suppressed.

Moreover, the target slip amount reduction dltTslipD is set to be larger during coasting than during driving. Hence, in the coasting state, where the increase rate of the turbine rotation speed corresponding to an increase in the engine load is great, discomfort and shock can be suppressed more reliably.

This invention is not limited to the embodiment described above, and may be subjected to various alterations and modifications within the scope of the technical spirit thereof.

For example, in this embodiment, the control is performed in the coasting state and the driving state, but the invention is not limited thereto, and the control may be performed in only the coasting state.

Further, the predetermined variation of the step S3 in FIG. 2 may be set even larger such that the control is essentially not performed during driving.

Further, in this embodiment, the predetermined variation does not take different values in the D range and the M range, but may be set larger in the M range than the D range. In so doing, the slip amount of the torque converter 1 decreases in the M range, and as a result, the driver can be provided with a sense of directness during an accelerator pedal depression operation.

Moreover, in this embodiment, the predetermined variation is set such that the control is performed at a predetermined high speed having a small speed ratio, but may be set at a large value such that the control is not performed at the predetermined high speed.

Furthermore, the control may be performed similarly when the automatic transmission according to this embodiment is a continuously variable transmission.

Furthermore, in this embodiment, the throttle opening variation dTH per unit time is used as a control starting condition, but the invention is not limited thereto, and another index indicating a variation rate in the required engine load, such as variation in the accelerator pedal operation amount, may be used instead.

This application claims priority from Japan Patent Application 2007-329744, filed Dec. 21, 2007, which is incorporated herein by reference in its entirety.

What is claimed is:

1. A lock-up clutch control device for an automatic transmission comprising:
   a lock-up clutch in a torque converter between an engine of a vehicle and an automatic transmission and configured to engage an engine side and an automatic transmission side of the torque converter;
   a lock-up clutch control unit which controls a slip amount of the lock-up clutch to a target slip amount when the lock-up clutch engages the engine side and the automatic transmission side, wherein the slip amount comprises a rotation speed difference between the engine side and the automatic transmission side;
   a required load variation rate calculation unit which calculates a variation rate of a required load of the engine, wherein the variation rate comprises one of a variation in a throttle opening per unit time and a variation in an accelerator pedal operation amount;
   a target slip amount increasing unit which increases the target slip amount at a predetermined increase rate to an upper limit target slip amount when the variation rate is equal to or greater than a predetermined variation rate; and
   a target slip amount reducing unit which reduces the target slip amount, after the target slip amount is increased to the upper limit target slip amount, from the upper limit target slip amount at a predetermined reduction rate to a base target slip amount,
   wherein the predetermined reduction rate is set to decrease as at least one of (i) a vehicle speed, when the variation rate reaches or exceeds the predetermined variation rate, increases and (ii) a speed ratio, when the variation rate reaches or exceeds the predetermined variation rate, decreases.

2. The lock-up clutch control device for an automatic transmission as defined in claim 1, wherein the predetermined variation rate is set to be smaller when the vehicle is in a coasting state immediately before the required load increases than when the vehicle is in a driving state immediately before the required load increases.

3. The lock-up clutch control device for an automatic transmission as defined in claim 1, wherein the predetermined variation rate is set to increase as the speed ratio decreases when the required load increases.

4. The lock-up clutch control device for an automatic transmission as defined in claim 1,
   wherein the predetermined increase rate increases when the vehicle speed decreases, and
   wherein the vehicle speed comprises a speed at which the variation rate reaches or exceeds the predetermined variation rate.

5. The lock-up clutch control device for an automatic transmission as defined in claim 1,
   wherein the upper limit target slip amount increases when the vehicle speed decreases, and
   wherein the vehicle speed comprises a speed at which the variation rate reaches or exceeds the predetermined variation rate.

6. The lock-up clutch control device for an automatic transmission as defined in claim 1,
   wherein the upper limit target slip amount increases when the speed ratio increases, and
   wherein the speed ratio comprises a speed ratio at which the variation rate reaches or exceeds the predetermined variation rate.

7. The lock-up clutch control device for an automatic transmission as defined in claim 1,
   wherein the upper limit target slip amount is set to be larger when the vehicle is in a coasting state immediately before the variation rate reaches or exceeds the predetermined variation rate than when the vehicle is in a driving state immediately before the variation rate reaches or exceeds the predetermined variation rate.

8. The lock-up clutch control device for an automatic transmission as defined in claim 1, wherein the predetermined reduction rate is set to be larger when the vehicle is in a coasting state immediately before the variation rate reaches or exceeds the predetermined variation rate than when the vehicle is in a driving state immediately before the variation rate reaches or exceeds the predetermined variation rate.

9. A lock-up clutch control method for an automatic transmission having a lock-up clutch in a torque converter between an engine of a vehicle and an automatic transmission and configured to engage an engine side and an automatic transmission side of the torque converter, the method comprising;
   a step of controlling, by a controller, a slip amount of the lock-up clutch to a target slip amount when the lock-up clutch engages the engine side and the automatic transmission side, wherein the slip amount comprises a rotation speed difference between the engine side and the automatic transmission side;
   a step of calculating, by the controller, a variation rate of a required load of the engine, wherein the variation rate comprises one of a variation in a throttle opening per unit time and a variation in an accelerator pedal operation amount;
   a step of increasing, by the controller, the target slip amount at a predetermined increase rate to an upper limit target slip amount when the variation rate is equal to or greater than a predetermined variation rate; and
   a step of reducing, by the controller, the target slip amount, after the target slip amount is increased to the upper limit target slip amount, from the upper limit target slip amount at a predetermined reduction rate to a base target slip amount,
   wherein the predetermined reduction rate is set to decrease as at least one of (i) a vehicle speed, when the variation rate reaches or exceeds the predetermined variation rate, increases and (ii) a speed ratio, when the variation rate reaches or exceeds the predetermined variation rate, decreases.

10. A lock-up clutch control device for an automatic transmission comprising:

a lock-up clutch in a torque converter between an engine of a vehicle and an automatic transmission and configured to engage an engine side and an automatic transmission side of the torque converter;

a lock-up clutch control means which controls a slip amount of the lock-up clutch to a target slip amount when the lock-up clutch engages the engine side and the automatic transmission side, wherein the slip amount comprises a rotation speed difference between the engine side and the automatic transmission side;

a required load variation rate calculation means which calculates a variation rate of a required load of the engine, wherein the variation rate comprises one of a variation in a throttle opening per unit time and a variation in an accelerator pedal operation amount;

a target slip amount increasing means which increases the target slip amount at a predetermined increase rate to an upper limit target slip amount when the variation rate is equal to or greater than a predetermined variation rate; and a target slip amount reducing means which reduces the target slip amount, after the target slip amount is increased to the upper limit target slip amount, from the upper limit target slip amount at a predetermined reduction rate to a base target slip amount, wherein the predetermined reduction rate is set to decrease as at least one of (i) a vehicle speed, when the variation rate reaches or exceeds the predetermined variation rate, increases and (ii) a speed ratio, when the variation rate reaches or exceeds the predetermined variation rate, decreases.

* * * * *